US012612004B2

(12) United States Patent
Abe et al.

(10) Patent No.: US 12,612,004 B2
(45) Date of Patent: Apr. 28, 2026

(54) COLLISION DETERMINATION DEVICE FOR VEHICLE

(71) Applicant: TOYOTA JIDOSHA KABUSHIKI KAISHA, Toyota (JP)

(72) Inventors: Yuta Abe, Toyota (JP); Masahiko Karube, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 18/647,264

(22) Filed: Apr. 26, 2024

(65) Prior Publication Data

US 2024/0359651 A1 Oct. 31, 2024

(30) Foreign Application Priority Data

Apr. 27, 2023 (JP) ................................. 2023-073420

(51) Int. Cl.
*B60R 21/01* (2006.01)
*B60R 21/0132* (2006.01)
*B60W 50/14* (2020.01)

(52) U.S. Cl.
CPC ......... *B60R 21/0132* (2013.01); *B60W 50/14* (2013.01)

(58) Field of Classification Search
CPC .............. B60R 21/0132; B60W 50/14; B60W 2520/105
See application file for complete search history.

(56) References Cited

U.S. PATENT DOCUMENTS

| | | | | |
|---|---|---|---|---|
| 10,429,506 | B2 | 10/2019 | Tanaka et al. | |
| 2003/0111287 | A1* | 6/2003 | Enomoto | B60R 21/013 |
| | | | | 180/274 |
| 2004/0236491 | A1 | 11/2004 | Seto | |
| 2009/0210117 | A1* | 8/2009 | Oowada | B60R 21/01332 |
| | | | | 701/46 |
| 2014/0195070 | A1 | 7/2014 | Shimizu et al. | |
| 2019/0329708 | A1* | 10/2019 | Hakki | B60Q 9/008 |
| 2019/0335035 | A1* | 10/2019 | Borras | H04M 1/72421 |
| 2019/0344740 | A1* | 11/2019 | Hakki | B60R 21/0132 |
| 2023/0256964 | A1* | 8/2023 | Ikezawa | B60W 50/14 |
| | | | | 701/93 |
| 2024/0151000 | A1* | 5/2024 | Takeno | E02F 9/02 |
| 2024/0270238 | A1* | 8/2024 | Min | B60W 30/0956 |

FOREIGN PATENT DOCUMENTS

| | | |
|---|---|---|
| JP | 2004-345518 A | 12/2004 |
| JP | 2005-212662 A | 8/2005 |
| JP | 2006-240453 A | 9/2006 |
| JP | 2014-133478 A | 7/2014 |

* cited by examiner

*Primary Examiner* — Sizo B Vilakazi
(74) *Attorney, Agent, or Firm* — Finnegan, Henderson, Farabow, Garrett and Dunner, LLP

(57) ABSTRACT

The processor 152 of ECU150 is configured to acquire an acceleration in a front-rear direction of the vehicle, acquire a speed change of the vehicle, acquire a distance between an object existing in a periphery of the vehicle and the vehicle, and determine that the vehicle has a light collision when at least one of the acceleration being equal to or greater than a first predetermined value and the speed change being equal to or greater than a second predetermined value is satisfied and the distance is equal to or less than a third predetermined value.

2 Claims, 4 Drawing Sheets

Figure 5:
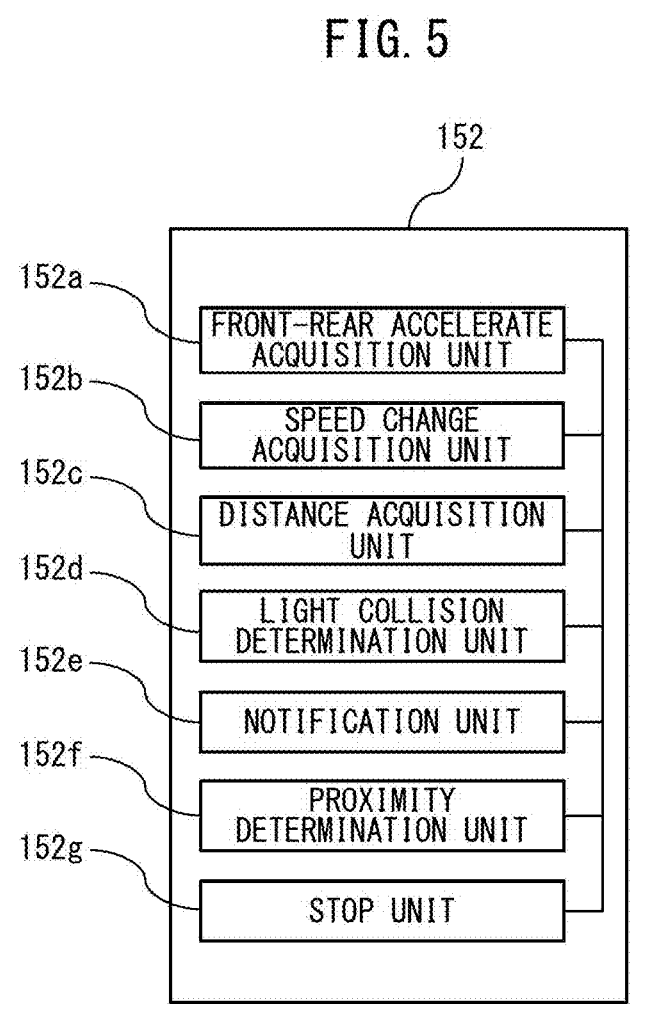

152a ── FRONT-REAR ACCELERATE ACQUISITION UNIT

152b ── SPEED CHANGE ACQUISITION UNIT

152c ── DISTANCE ACQUISITION UNIT

152d ── LIGHT COLLISION DETERMINATION UNIT

152e ── NOTIFICATION UNIT

152f ── PROXIMITY DETERMINATION UNIT

152g ── STOP UNIT

FIG. 6

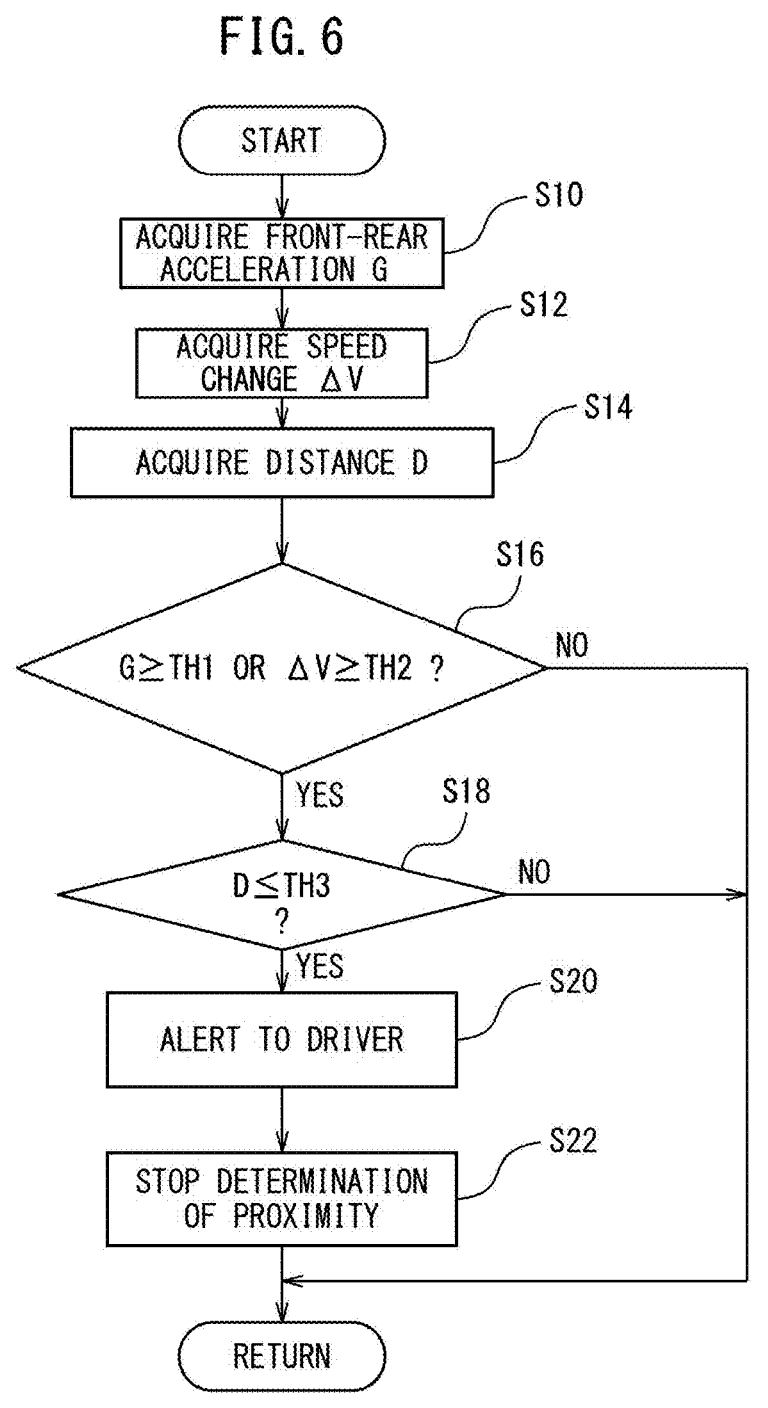

START

ACQUIRE FRONT-REAR ACCELERATION G ⟶ S10

ACQUIRE SPEED CHANGE $\Delta V$ ⟶ S12

ACQUIRE DISTANCE D ⟶ S14

$G \geq TH1$ OR $\Delta V \geq TH2$ ? ⟶ S16    NO

YES   S18

$D \leq TH3$ ?    NO

YES

ALERT TO DRIVER ⟶ S20

STOP DETERMINATION OF PROXIMITY ⟶ S22

RETURN

COLLISION DETERMINATION DEVICE FOR VEHICLE

FIELD

The present invention relates to a collision determination device for a vehicle.

BACKGROUND

Conventionally, JP-A-2005-212662 describes that a collision detection sensor that detects a stress generated in an external member of a vehicle for detecting a vehicle collision is provided near an ultrasonic receiver.

SUMMARY

Technical Problem

A sensor such as an ultrasonic receiver described in the above patent literature is often mounted on a bumper at a front and rear end of a vehicle to prevent collision with an obstacle at a low speed such as at parking. In such a sensor, a direction and an angle to be detected are determined in advance. When the bumper is distorted due to a slight collision, a deviation (hereinafter, also referred to as an axial deviation) of an actual direction of the sensor with respect to a direction or an angle originally to be detected by the sensor occurs. Even if a function of detecting a failure such as a communication failure or a conduction failure of the sensor itself is provided on the vehicle side, a function of detecting an axial misalignment caused by deformation of the bumper is not normally provided. Then, in the case of a failure caused by an axial misalignment that does not lead to a failure of the sensor, the sensor itself does not fail and operates normally. Therefore, there arises a problem that the driver of the vehicle trusts an erroneous detection result due to the axial misalignment.

In addition, even if an axial deviation of the sensor occurs due to a distortion of the bumper due to a slight collision, it is not possible to prompt the driver to inspect or check the sensor from the vehicle side unless it is a sensor failure such as a conduction failure. Therefore, it is not possible to warn the driver of the possibility of a system abnormality. Furthermore, if the sensor is off-axis, an object (obstacle) around the vehicle cannot be accurately detected, and the vehicle may come into contact with the object.

Further, the vehicle may include a system for detecting a crash to activate the airbag. Also in this case, a slight collision with a degree that the bumper is somewhat distorted is not often the detection target from the viewpoint of preventing unnecessary operation.

In the technique described in the above patent literature, in addition to the ultrasonic receiver, a collision detection sensor is further provided, and there is a problem in that a manufacturing cost is increased in order to detect a collision. In addition, in the technique described in this document, in view of the fact that the characteristics of the direct wave received when the ultrasonic transmitter and the ultrasonic receiver are at the positions settled at the vehicle design stage are substantially constant, whether or not deformation has occurred in the member in which the ultrasonic receiver is installed is determined based on whether or not the constancy is maintained. Therefore, although it is possible to determine after the fact that a light collision to the extent that the bumper is deformed has occurred, it is difficult to determine when the light collision has occurred.

In view of the above problems, an object of the present disclosure is to provide a collision determination device for a vehicle capable of determining a slight collision with a simple configuration.

Solution to Problem

The gist of the present disclosure is as follows.

(1) A collision determination device for a vehicle including a processor, wherein the processor is configured to acquire an acceleration in a front-rear direction of the vehicle, acquire a speed change of the vehicle, acquire a distance between an object existing in a periphery of the vehicle and the vehicle, and determine that the vehicle has a light collision when at least one of the acceleration being equal to or greater than a first predetermined value and the speed change being equal to or greater than a second predetermined value is satisfied and the distance is equal to or less than a third predetermined value.

(2) The collision determination device for a vehicle according to (1) above, wherein the processor is configured to generate a predetermined notification to a driver of the vehicle when it is determined that the vehicle has lightly collided.

(3) The collision determination device for a vehicle according to (1) or (2), wherein the processor is configured to temporarily stop the determination of the proximity of the object to the vehicle using the proximity sensor when it is determined that the vehicle has lightly collided.

Advantageous Effects of Invention

According to the present disclosure, it is possible to provide a collision determination device for a vehicle capable of determining a slight collision with a simple configuration.

BRIEF DESCRIPTION OF DRAWINGS

FIG. 5 is a schematic diagram showing a functional block of a processor of ECU.

FIG. 6 is a flow chart showing a process which the processor of ECU performs.

DESCRIPTION OF EMBODIMENTS

Figure 1:
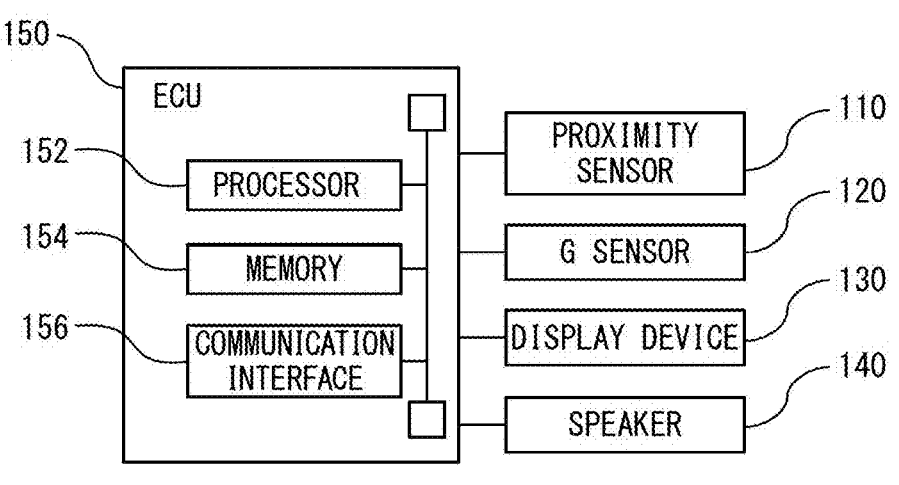
FIG. 1 is a schematic diagram illustrating a configuration of a collision determination system according to an embodiment.

Hereinafter, some embodiments of the present invention will be described with reference to the drawings. However, these descriptions are intended to be merely exemplary of the preferred embodiments of the present invention and are not intended to limit the present invention to such specific embodiments. In the following description, the same reference numerals are given to the same constituent elements.

FIG. 1 is a schematic diagram illustrating a configuration of a vehicle system 100 according to an embodiment. The vehicle system 100 is mounted on a vehicle such as an automobile. A proximity sensor (such as a clearance sonar) is provided in the vicinity of the front and rear end portions of the vehicle. The vehicle system 100 uses the proximity sensor to determine the proximity of the vehicle to another vehicle, a wall, or the like, which is parked adjacent to the vehicle, for example, when the vehicle is in a garage. Further, the vehicle system 100 uses the proximity sensor to determine a collision with an object (another vehicle, a person, or the like) of the vehicle, more specifically, a minor collision. Then, the vehicle system 100 notifies the driver of the vehicle of the fact that a slight collision has occurred such that the proximity sensor does not fail. In addition, when the vehicle system 100 determines that a slight collision has occurred such that the proximity sensor does not fail, it temporarily disables the proximity determination using the proximity sensor.

As illustrated in FIG. 1, the vehicle-system 100 includes a proximity sensor 110, a G sensor 120, a display device 130, a speaker 140, and an electronic control unit (hereinafter referred to as a ECU) 150. Each of the proximity sensor 110, the G sensor 120, the display device 130, the speaker 140, and ECU150 is connected via an in-vehicle network compliant with a standard such as a controller area network (Controller Area Network (CAN).

The proximity sensor 110 is a sensor that detects proximity of an object to a vehicle. The proximity sensor 110 is, for example, a sensor such as an ultrasonic sensor (clearance sonar), a lidar (Lidar: Light Detection and Ranging), or a radar (Radar). A plurality of proximity sensors 110 may be provided in the bumpers at the front and rear ends of the vehicle.

The G sensor 120 detects an acceleration G applied to the vehicle, in particular, an acceleration G in the front-rear direction of the vehicle. The G sensor 120 may be included in a system for operating an airbag. The G sensor 120 may then be sent to ECU150 via ECU of the airbag system.

The display device 130 includes, for example, a liquid crystal display (LCD). The display device 130 is provided in a meter panel or the vicinity of a dashboard inside the vehicle, and displays a notification directed to the driver. Similarly, the speaker 140 is provided in the vehicle and outputs a notification directed to the driver by voice. The notification for the driver includes a notification that notifies the driver when it is determined by the determination logic according to the present embodiment that the vehicle has been lightly collided. The notification for the driver includes a notification notifying the driver that the proximity determination using the proximity sensor 110 is not available thereafter. In addition, the notification for the driver includes, for example, a notification notifying the driver when it is determined that an object (a vehicle that is parked adjacent to the vehicle, a wall, or the like) is close to the vehicle by the proximity determination using the proximity sensor 110 at the time of the garage or the like.

ECU150 includes a processor 152, memories 154, and a communication interface 156. The processor 152 includes one or more CPU and peripheral circuitry thereof. The processor 152 provides a predetermined function by executing a computer program executably loaded in a work area of the memory 154. The memory 154 includes, for example, a volatile semiconductor memory and a non-volatile semiconductor memory. The communication interface 156 has interface circuitry for connecting ECU150 to an in-vehicle network or to an external communication network. ECU150 may be an ECU of a system (clearance sonar system) that uses the proximity sensor 110 to determine the proximity of an object to the vehicle.

Figure 2:
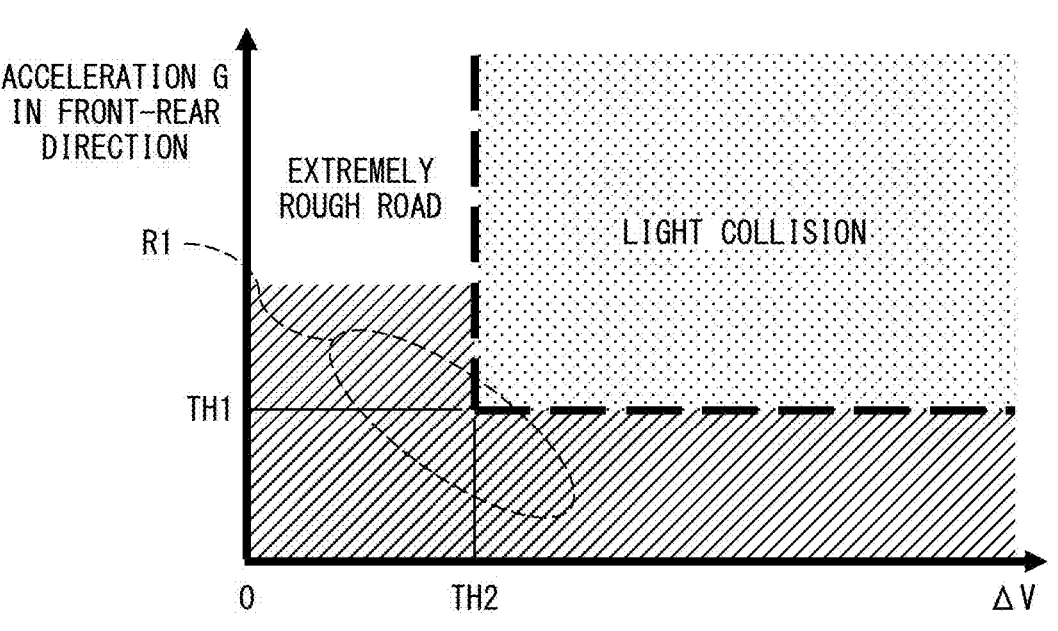
FIG. 2 is a diagram for explaining the logic of the collision determination by the collision determination system.

FIG. 2 is a diagram for explaining the logic of the collision determination by the vehicle system 100. The vehicle system 100 determines the light collision of the vehicle based on the acceleration G in the front-rear direction of the vehicle detected by the G sensor 120 and the speed change ($\Delta$V) of the integrated value (speed V) of the acceleration G per predetermined period (e.g., 150 ms). Further, the vehicle system 100 determines a lighter collision based on the acceleration G, $\Delta$V, and the distance D between the vehicle and an object present in the vicinity of the vehicle. The distance D is acquired by the proximity sensor 110 based on the detection value.

Figure 3:
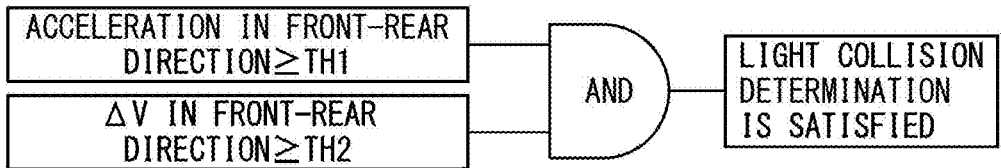
FIG. 3 is a schematic diagram showing a normal light collision determination logic.

First, the conventional light collision determination logic will be described. FIG. 3 is a schematic diagram illustrating a normal light collision determination logic using the acceleration G. In the determination logic illustrated in FIG. 3, when the acceleration G is equal to or greater than the threshold TH1 illustrated in FIG. 2 and $\Delta$V is equal to or greater than the threshold TH2, the vehicle 100 determines that the vehicle has lightly collided. That is, the vehicle system 100 determines that the vehicle has a light collision when the accelerations G and $\Delta$V belong to the range in which the dots are attached in FIG. 2. For example, the light collision corresponds to a case where the vehicles collide with each other while being lapped by about 5%, a case where the vehicle ride on a curbstone having a height of about 20 cm at an angle of 90 degrees, and the like. The light collision here may be a collision to the extent that the airbag does not operate. Relatively large impacts of the degree to which the airbag operates may be determined by thresholds that are greater than the threshold TH1 and TH2.

If a collision is to be determined only by the acceleration G, a light collision may be erroneously determined when the vehicle travels on the unevenness road surface and the acceleration G instantaneously becomes equal to or larger than the threshold TH1. Examples of the unevenness road surface include a rough road or a speed breaker installed on a road. On the other hand, the value of $\Delta$V is not equal to or larger than the threshold TH2 unless the velocity V 10) is changed during the above-described predetermined period. That is, the value of $\Delta$V is not equal to or greater than the threshold TH2 when the acceleration G instantaneously becomes equal to or greater than the threshold TH1. Therefore, by performing the determination based on $\Delta$V in addition to the acceleration G, it is possible to prevent the determination as a light collision from being erroneously made during a rough road travel or the like.

However, in the normal light collision determination logic illustrated in FIG. 3, for a lighter collision, the acceleration G is equal to or greater than the threshold TH1 illustrated in FIG. 2, and the $\Delta$V is not equal to or greater than the threshold TH2. Therefore, the determination as a light collision is not established. For example, a collision in a low-speed range that does not affect the traveling, a very small slight contact, or the like cannot be determined by the determination logic of the light collision shown in FIG. 3. Therefore, the determination logic illustrated in FIG. 3 cannot be applied to determination of a slight collision such that the proximity sensor 110 itself does not fail and the bumper is deformed to cause an axial misalignment of the proximity sensor 110.

Figure 4:
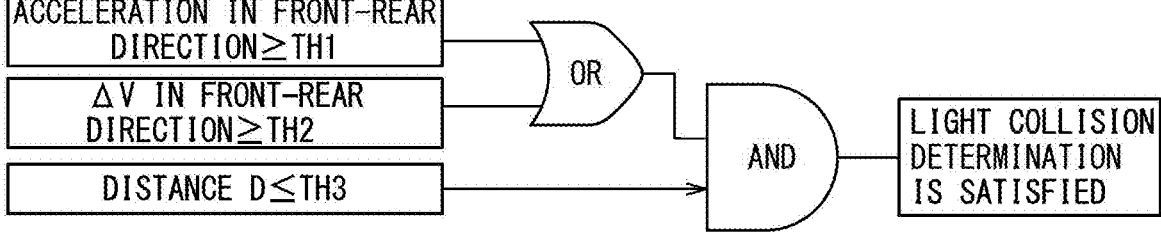
FIG. 4 is a schematic diagram showing a determination logic for determining a light collision including minor collisions.

Therefore, in the present embodiment, in order to determine the light collision including the lighter collision, the determination logic shown in FIG. 4 determines the light collision. In the determination logic illustrated in FIG. 4, the vehicle system 100 determines that the vehicle has lightly collided when at least one of the acceleration G being equal to or greater than the threshold TH1 and ΔV being equal to or greater than the threshold TH2 is satisfied and the distance D is equal to or less than the threshold TH3. Here, the threshold TH3 may be 0 or a negative value smaller than 0. Including zero or negative values in the threshold TH3 can include in the light crash cases where the vehicle touches an object and the object is caught in a bumper or the like.

As an example, FIG. 2 illustrates a range in which the distance D can be equal to or smaller than the threshold TH3 with hatching. According to the determination logic illustrated in FIG. 4, when at least one of the acceleration G being equal to or greater than the threshold TH1 and ΔV being equal to or greater than the threshold TH2 is satisfied, it can be determined as a light collision. Thus, the region R, shown in dashed lines in FIG. 2, can be determined as a light collision. If the thresholds TH1, TH2 are further reduced, the areas R where the accelerations G and ΔV are smaller will be determined as light impacts. This makes it possible to determine a lighter collision. The lighter collision is, for example, a case where the vehicles collide with each other with a small amount of lap, a case where the vehicle comes into contact with the guardrail at an angle of about 5°, a case where the vehicle pass through the post cone, and the like.

As described above, according to the determination logic of FIG. 4, an area determined as a light collision is enlarged as compared with the determination logic of FIG. 3. As a result, a slight collision of the degree to which the bumper is deformed and axial misalignment of the proximity sensor 110 occurs is determined as a light collision.

When an area determined as a light collision is enlarged, it is important how to separate a case where the vehicle travels on a bad road or the like from a case where the vehicle travels on a light collision. As described above, the determination of ΔV≥TH2 is made so as not to be determined as a light collision during traveling of a rough road or the like. Therefore, in the determination logic of FIG. 4, if the light collision is determined only in OR condition of G≥TH1 and ΔV≥TH2, there is a possibility that the light collision is erroneously determined in the case of G≥TH1 and ΔV<TH2 during traveling of the rough road and the like. However, in the determination logic of FIG. 4, D≤TH3 is added in AND condition. Since D≤TH3 does not occur during traveling of the rough road and the like, it can be determined that the light collision is satisfied if AND condition is satisfied. On the other hand, if G≥TH1 and ΔV<TH2, it can be determined that the traveling of the rough road and the like is performed. Therefore, according to the determination logic of FIG. 4, even if an area determined as a light collision is enlarged by setting G≥TH1 and ΔV≥TH2 as OR conditions, it is possible to separate the running of the rough road and the light collision.

As described above, when a collision occurs such that the proximity sensor 110 attached to the bumper does not fail, the proximity sensor 110 is misaligned. Then, there is a possibility that the sensor information detected thereafter becomes incorrect. According to the determination logic illustrated in FIG. 4, it is possible to determine a light collision that does not cause a failure of the proximity sensor 110 as a light collision. Therefore, by temporarily disabling the proximity determination thereafter, an error in the proximity determination is suppressed.

FIG. 5 is a schematic diagram illustrating functional blocks of the processor 152 of ECU150 for realizing the above-described processes. The processor 152 is an aspect of a collision determination device for vehicle according to the present disclosure, and includes a front-rear acceleration acquisition unit 152a, a speed change acquisition unit 152b, a distance acquisition unit 152c, a light collision determination unit 152d, a notification unit 152e, a proximity determination unit 152f, and a stop unit 152g. These units included in the processor 152 are, for example, functional modules realized by a computer program running on the processor 152. That is, each of these units included in the processor 152 includes a processor 152 and a program (software) for causing the processor to function.

The front-rear acceleration acquisition unit 152a of the processor 152 acquires an acceleration G in a front-rear direction of the vehicle detected by the G sensor 120. The speed change acquisition unit 152b of the processor 152 acquires the speed change ΔV of the vehicle per predetermined period by integrating the acceleration G in the front-rear direction. The distance acquisition unit 152c of the processor 152 acquires a distance D between an object existing in a periphery of the vehicle and the vehicle, based on, for example, the detected values of the plurality of proximity sensors 110.

The light collision determination unit 152d of the processor 152 determines that the vehicle has a light collision when at least one of the acceleration G being equal to or greater than the threshold TH1 and ΔV being equal to or greater than the threshold TH2 is satisfied and the distance D is equal to or less than the threshold TH3. As a result, the area determined as a light collision is enlarged, and it is also possible to separate the traveling of the rough road and the light collision from each other. Therefore, even if the proximity sensor 110 is a minor collision that does not cause a failure, it can be determined as a minor collision.

The notification unit 152e of the processor 152 generates a predetermined notification to the drivers of the vehicle when it is determined that the vehicle has a light collision. Specifically, the notification unit 162e causes the display device 130 to display a warning or causes the speaker 140 to output a similar warning by sound. An example of a warning is "A light collision has occurred! Since there is a possibility of malfunction, proximity determination is not available thereafter." As a result, the driver that has received the notification can recognize that a light collision has occurred and that the proximity determination cannot be used.

The proximity determination unit 152f of the processor 152 performs proximity determination of an object to the vehicle using the proximity sensor 110, for example, at the time of garage placement.

When it is determined that the vehicle has a light collision, the stop unit 152 temporarily stops the determination of the proximity of the object to the vehicle using the proximity sensor 110 thereafter. This prevents the driver of the vehicle from trusting an erroneous proximity determination result due to the axial misalignment of the proximity sensor 110.

Next, a process performed by the processor 152 of ECU150 will be described based on the flow chart of FIG. 6. The processing of FIG. 6 is performed by the processor 152 at predetermined control cycles. First, the front-rear acceleration acquisition unit 152a acquires the front-rear acceleration G detected by the G sensor 120 (step S10). Next, the speed change acquisition unit 152b acquires the speed change ΔV per predetermined period (step S12). Next, the distance acquisition unit 152c acquires a distance D between the vehicle and an object existing in the vicinity of the vehicle (step S14).

Next, the light collision determination unit 152*d* determines whether or not G≥TH1 or ΔV≥TH2 (step S16). When G≥TH1 or ΔV≥TH2 is satisfied, it is determined whether or not the light collision determination unit 152*d* is D≤TH3 (step S18). If D≤TH3 in the step S18, the notification unit 152*e* generates an alert to the drivers of the vehicle (step S20). Next, the stop unit 152*g* temporarily stops the determination of the proximity of the object to the vehicle using the proximity sensor 110 (step S22). If G≥TH1 or ΔV≥TH2 in the step S16 is not satisfied or D≤TH3 in the step S18 is not satisfied, the process in this control cycle ends.

The determination of the failure of the proximity sensor 110 due to a communication failure, a conduction failure, or the like is always performed by a flow process different from the determination of the light collision. When it is determined that the proximity sensor 110 has failed, the driver is notified of the failure from the display device 130 or the speaker 140.

As described above, according to the present embodiment, when at least one of the acceleration G being equal to or greater than the threshold TH1 and ΔV being equal to or greater than the threshold TH2 is satisfied and the distance D is equal to or less than the threshold TH3, it is determined that the vehicle has lightly collided. Therefore, an area determined as a light collision is enlarged, and it is also possible to separate the traveling of a rough road or the like and the light collision. Therefore, even a lighter collision can be determined as a lighter collision.

The invention claimed is:

1. A collision determination device for a vehicle including a processor, wherein the processor is configured to:

acquire an acceleration in a front-rear direction of the vehicle, acquire a speed change of the vehicle, acquire a distance between an object existing in a periphery of the vehicle and the vehicle, determine that the vehicle has a light collision when at least one of the acceleration being equal to or greater than a first predetermined value and the speed change being equal to or greater than a second predetermined value is satisfied and the distance is equal to or less than a third predetermined value, and temporarily stop the determination of the proximity of the object to the vehicle by using a proximity sensor when it is determined that the vehicle has a light collision.

2. The vehicle collision determination device according to claim 1, wherein the processor is configured to generate a predetermined notification to a driver of the vehicle when it is determined that the vehicle has a light collision.

\* \* \* \* \*